US010340690B2

(12) United States Patent
Hoffmeister et al.

(10) Patent No.: US 10,340,690 B2
(45) Date of Patent: Jul. 2, 2019

(54) INTERFERENCE SUPPRESSION STAGE AND POWER SUPPLY

(71) Applicant: Robert Bosch GmbH, Stuttgart (DE)

(72) Inventors: Fabian Hoffmeister, Schoenau (DE); Josef Plager, Bogen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 15/795,467

(22) Filed: Oct. 27, 2017

(65) Prior Publication Data

US 2018/0123340 A1    May 3, 2018

(30) Foreign Application Priority Data

Oct. 31, 2016  (DE) ........................ 10 2016 221 379

(51) Int. Cl.

| *H02J 1/02* | (2006.01) |
| *G05F 3/24* | (2006.01) |
| *H02M 3/335* | (2006.01) |
| *H04B 1/10* | (2006.01) |
| *H04B 1/12* | (2006.01) |
| *H04B 15/02* | (2006.01) |
| *H02M 3/158* | (2006.01) |

(52) U.S. Cl.
CPC ................ *H02J 1/02* (2013.01); *G05F 3/242* (2013.01); *H02M 3/1584* (2013.01); *H02M 3/33507* (2013.01); *H04B 1/109* (2013.01); *H04B 1/123* (2013.01); *H04B 15/02* (2013.01)

(58) Field of Classification Search
CPC ......... H02J 1/02; G05F 3/242; H02M 3/1584; H02M 3/33507; H04B 1/109; H04B 1/123; H04B 15/02
See application file for complete search history.

(56) References Cited

U.S. PATENT DOCUMENTS 8,368,252 B2 * 2/2013 Pabon ................... H02M 7/219
                                                      307/31
8,736,246 B2 * 5/2014 Yeh ..................... H02M 1/4225
                                                     323/207

FOREIGN PATENT DOCUMENTS

EP            2983281         2/2016

* cited by examiner

*Primary Examiner* — Daniel C Puentes
(74) *Attorney, Agent, or Firm* — Michael Best & Friedrich LLP

(57) ABSTRACT

An interference suppression stage for a power supply. The interference suppression stage has an input connected to an input module of the power supply, the input module connected to an electrical supply system, an output connected to an output module of the power supply, the output module connected to an electrical load, at least two power paths connected in parallel between input and output, wherein each of the power paths are configured to be switched between an active state and an inactive state, and a control unit configured to switch at least one of the power paths to the inactive state in a saving mode. The control unit switches different power paths alternately in time to inactive in saving mode.

15 Claims, 2 Drawing Sheets

INTERFERENCE SUPPRESSION STAGE AND POWER SUPPLY

BACKGROUND OF THE INVENTION

The invention relates to an interference suppression stage for a power supply and to a power supply.

Due to legal specifications becoming more and more strict, current electronic devices have facilities which optimize the system current accepted with regard to their contained harmonics.

For example, a control device for an air conditioning facility is known from DE 10 2014 215 312 A1 which has at least one input terminal which can be connected to an electrical supply system; one output terminal to which the air conditioning facility can be connected; one frequency convertor; and an interference suppression device interconnected to the frequency convertor, having at least two power paths. By means of the interference suppression device, an entry of harmonics of the frequency convertor into the electrical supply system can be minimized.

SUMMARY OF THE INVENTION

It is the object of the invention to propose improvements with respect to a power supply.

The interference suppression stage contains an input. The input is used for connecting the interference suppression stage to an input module of the power supply. The input module is used for connecting the power supply to an electrical supply system.

The interference suppression stage contains an output. The output is used for connecting the interference suppression stage to an output module of the power supply. The output module is used for connecting the power supply to an electrical load.

The interference suppression stage contains at least two power paths. The power paths are connected in parallel between input and output. Each power path thus leads from input to output. Each of the power paths can be switched between an active state (switched "active") and an inactive state (switched "inactive"). The power path transports power from input to output in the active state, but not in the inactive state.

The interference suppression stage contains a control unit. The control unit is configured to switch at least one of the power paths to inactive in a saving mode. The control unit is also configured to switch different power paths alternately in time to be inactive in saving mode.

The control unit thus switches between various inactive power paths: this means that a power path inactive in a time interval of the saving mode is switched to active and is active in the following time interval of the saving mode. At the same time, a power path active in the first time interval is switched to inactive and is then inactive in the second time interval. The number of inactive power paths remains the same in this context, as does the number of active power paths. However, the number of power paths switched active and inactive can be varied, particularly if more power flows through the interference suppression stage, the number of inactive power paths can be lowered and increased for less power. As a rule, this takes place in greater time intervals than the switch-over between inactive power paths of the same number.

In the case where the interference suppression stage is not operated in saving mode, all power paths are switched to be active. The input module is, in particular, a rectifier. The output module is, in particular, a direct voltage intermediate circuit.

The invention provides the advantage that in saving mode, not always the same power path is switched to be inactive and is thus unloaded or, respectively, only the always the same other power paths are active and thus loaded. By switching between different power paths it is ensured that in saving mode, different power paths are always switched again alternately to be inactive and active. Thus, unequal loading of different power paths can be avoided in the long run. Loaded power paths are subject to faster aging, wear etc. Thus it can be achieved that all power paths, if possible, are subject to the same amount of wear and tear, aging etc.

In a preferred embodiment, the saving mode is activated when the electrical current (its current intensity) flowing through the interference suppression stage is below a limit current (a limit current intensity). Alternatively, the decision can also be attached to a limit power which is transported by the interference suppression stage. A corresponding limit value is monitored by means of a current (or power) measurement. The saving mode is activated after the limit current is undercut. Above the limit current, all power paths are thus active and contribute to the power transmission in the interference suppression stage. Below the limit current, fewer power paths are sufficient for transporting the needed power or the current, respectively, through the interference suppression stage. The saving mode is active, at least one of the power paths is in each case inactive at a particular time. Thus, a simple criterion can be established for the activation of the saving mode.

In a preferred variant of this embodiment, the control unit is configured to activate the saving mode only after a waiting time after undercutting of the limit current. If thus, starting with a current intensity above the limit current, the limit current is undercut, the saving mode is not activated immediately but the waiting time is initially waited out. In the waiting time, it is checked whether the current remains below the limit current during the waiting time. It is only then that the saving mode is activated. If the current rises again above the limit current within the waiting time, the saving mode is not activated at least then. At a new drop of the current below the limit current, a waiting time is begun again and it is checked whether the current now remains below the limit current during the waiting time. It is only then that the saving mode is activated. In particular, a type of hysteresis is established by this means in order to prevent a continuous switching to and fro between saving mode and normal operation at currents within the range of the limit current.

In a preferred embodiment, the control unit is configured to switch an increasing number of power paths to be inactive in the saving mode for decreasing current or power. If the current drops below the limit current, one of the power paths is initially switched to be inactive. If the current drops further—particularly below a second limit value, a second power path is switched to be inactive, in the case of further dropping—particularly below a third limit value—a third power path, etc. This continued until—at n thresholds or limits below an $n^{th}$ or last limit value—only one of the power paths is still active. According to the invention, here various power paths are switched through for a specific number of inactive power paths. In particular, for the same powers or currents in the interference suppression stage, always the same number of power paths are switched to inactive. The same applies correspondingly in reverse: for an increasing number current or power, a decreasing number of power paths are switched to be inactive in saving mode. This is continued until only one power path is inactive. Here, too, the number of active power paths, in particular, is again increased in dependence on the transgression of respective limit values. If all power paths are switched to be active, the saving mode is ended.

In a preferred embodiment, the control unit is configured to switch all power paths to be inactive to the same extent in the temporal mean in saving mode. The temporal mean here relates, in particular, to a period having the same number of inactive power paths. However, the mean can also be related to a longer period or to the entire period of operation or life of the interference suppression stage. "To the same extent" means, in particular, that, if possible, all power paths in the mean or in total are switched to be inactive equally frequently and/or for equal lengths of time.

In a preferred variant of this embodiment, the control unit is configured to switch over the power paths in such a manner that a loading of respective identical components contained in the power paths is equal in the temporal mean. In particular, a power loading, thermal loading, voltage loading or loading in time is conceivable as loading in this context. The component is, in particular, a choke. The switching between the power paths thus takes place in such a manner that, averaged over a multiplicity of switching actions, on average all power paths are loaded equally with respect to a certain identical component contained in each power path. This ensures that the respective components in the interference suppression stage are loaded as equally as possible and thus the life of the interference suppression stage is greater than if one of the components were to be loaded particularly heavily, for example by corresponding power path being permanently switched in the active state.

In a preferred embodiment, the control unit is configured to perform the switch-over of the power paths periodically in saving mode. The switch-over of the power paths between the active and inactive state takes place, in particular, periodically in a repetitive pattern (order of the switched individuals of power paths) or in accordance with repetitive switch-over times or switch-over intervals. For example, different power paths are always switched over in the same order. This leads to a particularly regular operation of the interference suppression stage.

In a preferred embodiment, the control unit is configured to perform the switch-over of the power paths in saving mode after an in each case equal period of time. Thus, the same period of time is always waited out until a change occurs between power paths switched to be inactive and active. The switch-over of the power paths in the interference suppression stage can thus be implemented in a particularly simple and regular manner.

In a preferred embodiment, the power path contains a longitudinal branch which connects input and output. The longitudinal branch contains a series circuit of a choke as component and a diode as component. Between choke and diode, a ground branch is connected to the longitudinal branch. The ground branch contains an electrical switching element as component. The ground branch leads from the longitudinal branch via the switching element to a ground potential. This results in a particularly simple and conventional implementation of the power path.

The power supply contains the input module mentioned above and the output module mentioned above. The power supply also contains an interference suppression stage according to the invention. The interference suppression stage is connected with its input to the input module and connected with its output to the output module. The power supply and at least some of its embodiments and the respective advantages have already been explained analogously in conjunction with the interference suppression stage according to the invention.

The power supply is, in particular, a power supply of an audio amplifier.

The object of the invention is also achieved by an audio amplifier having a power supply according to the invention. The audio amplifier and at least some of its embodiments and the respective advantages have already been explained analogously in conjunction with the interference suppression stage according to the invention and the power supply according to the invention.

The object of the invention is also achieved by a method for operating an interference suppression stage. The interference suppression stage is constructed in accordance with the invention, but does not necessarily have to contain the control unit. According to the invention, at least one of the power paths is switched to be inactive in saving mode. In addition, different power paths are switched to be inactive alternatingly in time in saving mode.

The method and at least some of its embodiments and the respective advantages have already been explained analogously in conjunction with the subjects according to the invention of interference suppression stage, power supply and audio amplifier.

The invention is based on the following findings and considerations, wherein in this context the "invention" also means embodiments of the invention which correspond to combinations of the above-mentioned embodiments and/or possibly also include embodiments not mentioned previously.

A modern switched-mode power supply usually has a rectifier and a smoothing capacitor. In the case of loading, the latter is only charged if the sinusoidal mains voltage rises above the DC potential of the smoothing capacitor. The consequence is an only short current pulse which recharges the capacitor. If a Fourier analysis is performed of this current profile, numerous harmonics will be found. Depending on the relevant standard an admission can be impaired thereby.

It is the aim of a PFC (Power Factor Control) to optimize the harmonics, the spectrum of which is assessed via the power factor, in such a manner that apart from the fundamental (the current at 50 Hz), only a low number of harmonics are contained.

Typically, this is achieved via a boost convertor, the current consumption of which is controlled in such a manner that it always follows the mains voltage. Furthermore, a DC intermediate circuit is charged with said convertor, the voltage level of which is above the maximum mains peak voltage value (usually between 380 V and 400 V in the case of power supplies for single-phase low-voltage power supplies with an input voltage range between 100 Vac . . . 240 Vac).

In the case of devices of higher power, it may be appropriate to set up a PFC to be multi-phased (that is to say having a number of power paths). Between rectifier and DC intermediate circuit, a second (or further, in total n) boost stage (power path) is switched in parallel with the first for this purpose. In the control system, it must only be noted that in the n-stage operation, only the 1st/nth part of the reference current is supplied as nominal value in the boost convertors. Thus, the mains current will divide itself uniformly to all stages.

Advantages of a multi-stage PFC are, among others:

the mains current is distributed to a number of chokes, diodes and FETs. A higher current can thus be handled in a significantly simpler manner. Thus, the losses drop at high loads.

by clever activation of the stages (phase-displaced activation by 360°/n) it can be achieved that the switching ripple of the voltage at the DC intermediate circuit is deleted. This entails advantages with respect to EMV behavior, extension of the life of the intermediate-circuit capacitor and the audio performance in audio amplifiers.

However, disadvantages can also include:

each PFC stage must only supply and control a fraction of the total current. Since technical limits are set on the resolution of the current measurement and the possible current to be supplied to the boost stage, the power factor of the system will become worse compared with a single-stage implementation, particularly in the case of low loading of the DC intermediate circuit.

higher no-signal current consumption since n−1 further switching stages are operated (additional losses in MOSFET, driver and diode). Particularly in times with lower current consumption (e.g., during standby or slight-load case), the current consumption of a multi-phase approach is greater compared with a single-phase implementation (with one power path).

for the necessary inductances, core materials are usually used which are subject to an aging process. This is negatively influenced by temperature and switching load. This characteristic applies to inductances in DC-DC applications in general and is not a disadvantage of a multi-stage PFC specifically. This has a negative effect in particular as soon as different loads occur over life (additional stage is only added in rare cases).

Especially in the case of highly dynamic loads, such as, e.g., an audio amplifier, these disadvantages in some cases are difficult to compensate for.

The invention is based on the consideration that an audio amplifier is only loaded fully for a small part of its life. The predominant load case is the readiness or slight-load case. If an audio system in the public address domain (hotel, airport, sports stadium etc.) is considered as an example, it is largely in the low-load mode (background music, line monitoring, readiness inter alia). It is only for a short period that greater output powers are demanded such as, e.g., for an announcement, an event or in the case of an alarm. For this load case, an audio amplifier must be designed which, at the same time, can impair the efficiency in the low-load case.

The technology of the power factor correction (PFC) in the single-phase and multi-phase approach is established in the market.

All the abovementioned disadvantages can be reduced to a minimum by the invention described in the text which follows.

According to the invention, it is decided by the interference suppression stage, in dependence on the instantaneous input current or the instantaneous power whether only one power path (low-load case) or a number of power paths (high-load case) are activated. In the low-load case, only one power path of the interference suppression stage (PFC) is active in each case. In particular, operation is changed to another, particularly to the next, PFC power path after an adjustable time has elapsed. In particular, this is always continued periodically so that in the low-load case, in particular, all chokes are loaded equally over time and thus are subjected to the aging process in the same manner.

If the amplifier supplied by the power supply is then driven more (beginning of the concert, announcement, alarm case or similar) and a greater current is required, further power paths are added in parallel as required and the current is distributed to a number of power paths or phases.

If the load then drops below a certain value again and, in particular, does not rise again within a waiting time, the system drops back into the phase change mode (power-path change mode—saving mode).

Since in the low-load case, due to this method, only one power path is always in operation, energy can be significantly saved since in the power paths which are not active, no switching and driver losses are produced. As well, the power factor can be improved since the total current only has to be carried by one power path and the latter thus exploits the measuring range of its current measurement better.

The invention describes an active phase or power path management in the case of a PFC. In principle, it should be applicable to all multi-phase DC-DC convertor topologies.

According to the invention, an intelligent phase or power path management is produced in the case of multi-stage PFC topologies.

BRIEF DESCRIPTION OF THE DRAWINGS

Further features, effects and advantages of the invention are obtained from the following description of a preferred exemplary embodiment of the invention and the attached figures. In this context, a basic schematic diagram shows in.

DETAILED DESCRIPTION

Figure 1:
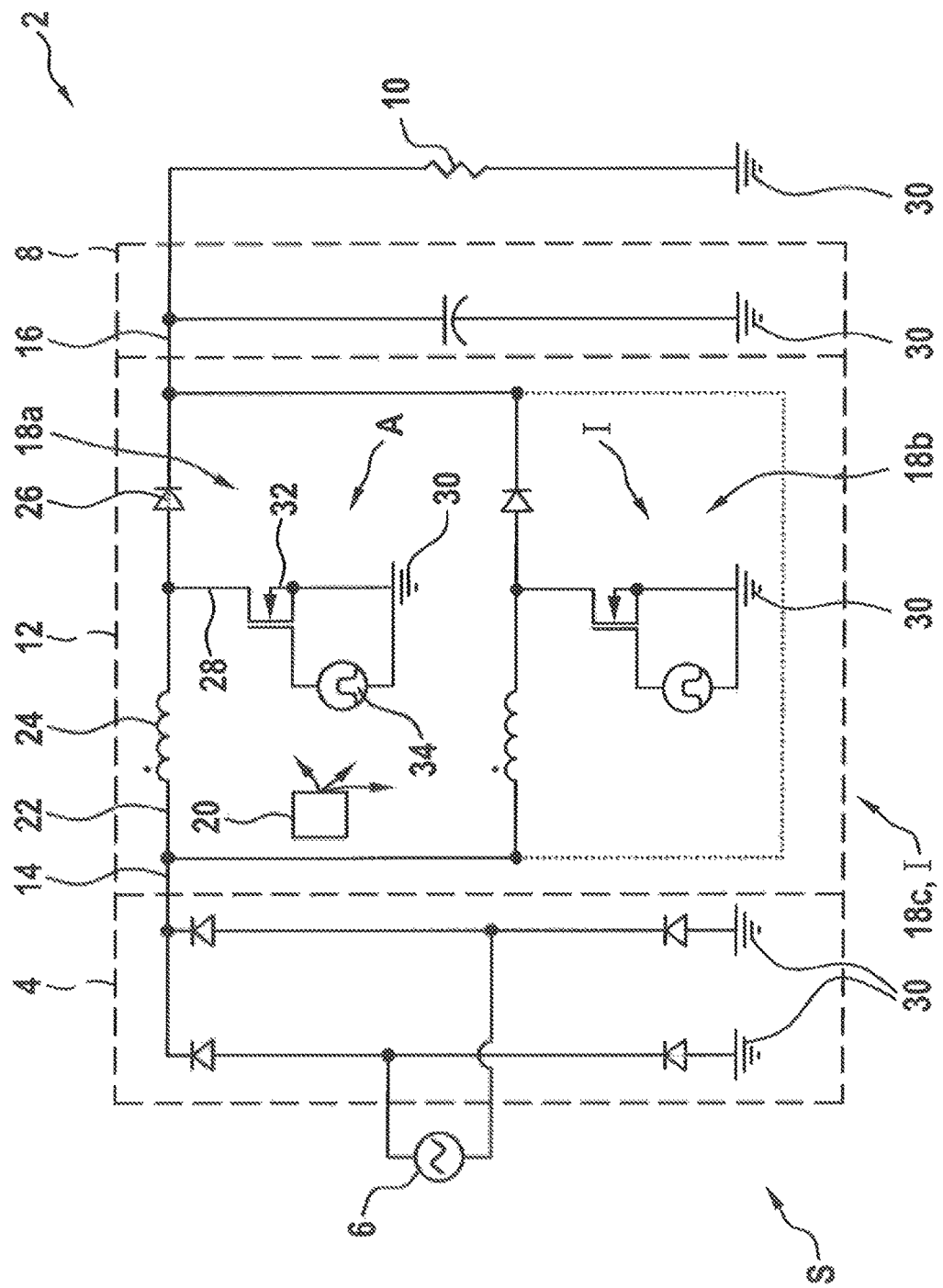
FIG. 1 a power supply

FIG. 1 shows a power supply 2 having an input module 4 which is used for connection to an electrical supply system 6. The input module 4 is here a bridge rectifier. The power supply 2 also contains an output module 8 which is used for connection to an electrical load 10. The output module is here a direct voltage intermediate circuit.

The power supply 2 also contains an interference suppression stage 12 having an input 14 and an output 16. The input 14 is connected to the input module 4. The output 16 is connected to the output module 8. The interference suppression stage 12 contains three power paths 18a-c of which in FIG. 1, only two are shown in detail for the sake of clarity, the third one is only indicated dashed. The three power paths 18a-c are identically constructed.

Each of the power paths 18a-c is selectively switchable between an active state A and an inactive state I. The interference suppression stage 12 contains a control unit 20 indicated only symbolically which switches the respective power paths 18a-c between the active state A and inactive state I. The activation of the power paths 18 by the control unit 20 is indicated only symbolically by arrows.

Each power path 18 contains one longitudinal branch 22 which connects the input 14 to the output 16. The longitudinal branch 22 contains a series circuit of a choke (component 24) and a diode (component 26). Between choke (component 24) and diode (component 26), a ground branch 28 is connected which leads from the longitudinal branch 22 to a ground 30. The ground branch 28 contains an electrical switching element (component 32) which is operated via a switching device 34. Via the switching device 34, a power factor correction (PFC) is implemented in an in principle conventional manner, not explained in greater detail here, in order to optimize the system current flowing from the supply system 6 with respect to its harmonics.

Figure 2:
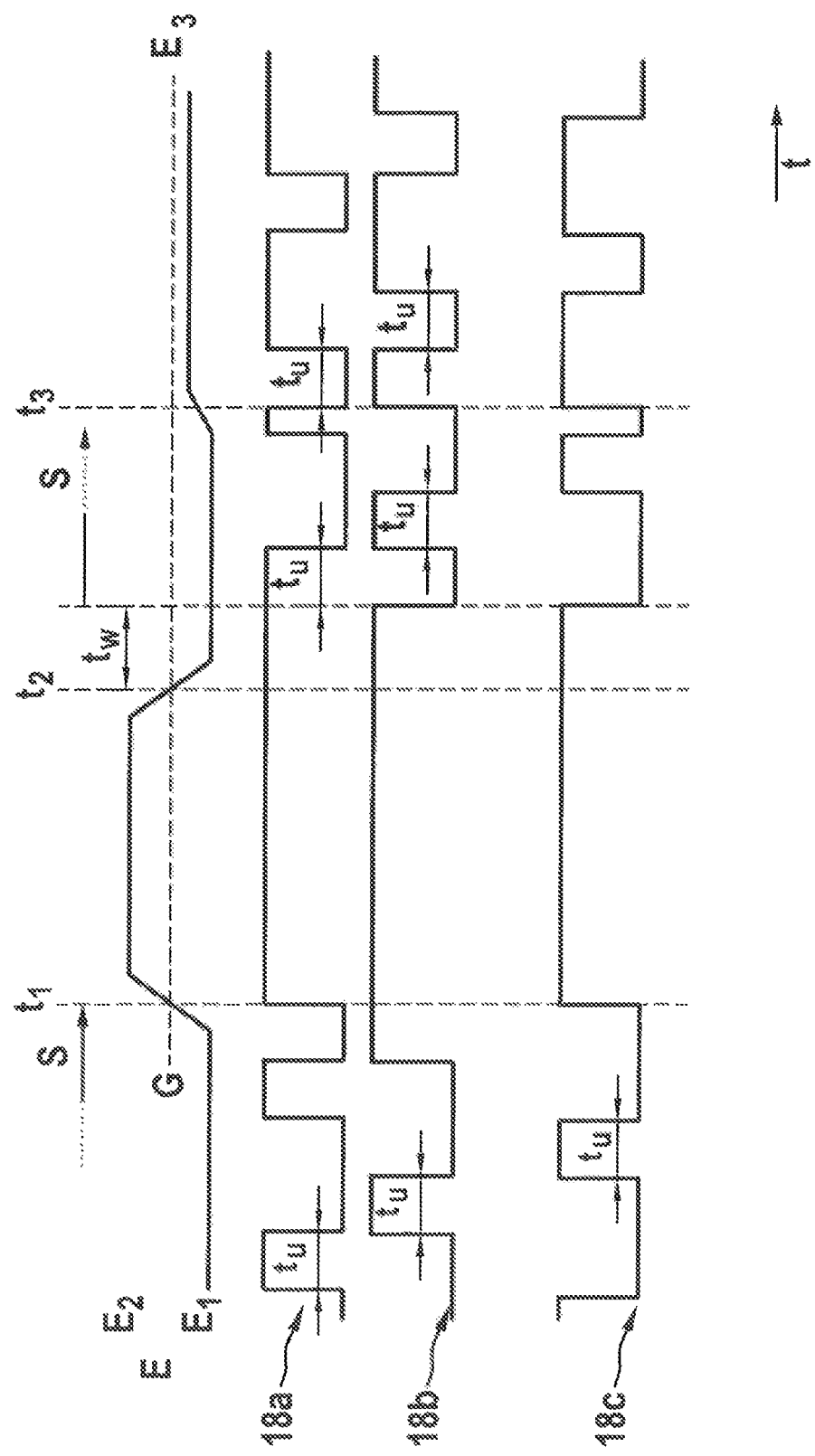
FIG. 2 a time profile for the switching-over of power paths.

FIG. 2 illustrates the operation of the interference suppression stage 12, shown over time t. The variation of the input current E with time is shown, which flows from the supply system 6 into the power supply 2. The input current is—only considered qualitatively here—initially "low" (current intensity E1), i.e. located below a limit current G. The interference suppression stage is in a saving mode S. In this mode, two of the power paths 18 are always switched to be inactive (in the inactive state I). In the change with time, different power paths 18 are then switched to be inactive. Initially, the power path 18*a* is in the active state A, the power paths 18*b, c* are in the inactive state I. Subsequently, the latter will be the power paths 18*a, c*, subsequently the power paths 18*a, b*. This is repeated periodically, that is to say subsequently again the power paths 18*b, c*, after that the power paths 18*a, c*, after that the power paths 18*a, b* are switched to be inactive. This would be continued always in this way. The switch-over occurs periodically and after a time interval to which is equal in each case.

However, the input current E begins to rise to "high" (current intensity E2) and reaches at time t1 the limit current G which corresponds to a limit power which is transported through the interference suppression stage 12. At this time, the saving mode S is ended and all power paths 18*a-c* are placed into the active state A. Subsequently, the input current begins to drop back to "low" (E1). At time t2, the limit current is undercut again. Nevertheless, saving mode S is not yet activated immediately. Initially, a waiting time tw is waited out. During the waiting time tw, it is checked if the limit current G is again exceeded. Since this does not take place, the system is switched over again into the saving mode S after the waiting time tw and the switching through of the power paths 18*a-c* takes place again as described above.

At time t3, the input current E increases slightly, but the limit current G is not exceeded. However, a second limit current G2, not shown, which is lower than the limit current G, is exceeded. Following this, the number of active power paths is increased from one to two. From then on, it is no longer two but only one of the three power paths 18*a-c* which is switched to be inactive, but the respective other two power paths 18 remain in the active state A. Thus, the power path 18*a* is initially switched to be inactive, subsequently the power path 18*b*, subsequently the power path 18*c*. This switch-over, too, is then repeated again periodically.

With increasing current E a decreasing number of power paths 18 are thus switched or reversed to be inactive. In temporal mean, all power paths 18 are thus switched to be inactive to the same extent. Due to equal current intensities (E/3 in this case), in all three power paths, the loading of the components (choke 24, diode 26, switching element 32) in the power paths 18 is equal in the temporal mean.

The invention claimed is:

1. An interference suppression stage (12) of a power supply (2), the interference suppression stage (12) comprising:
   an input (14) connected to an input module (4) of the power supply (2), the input module (4) connected to an electrical supply system (6),
   an output (16) connected to an output module (8) of the power supply (2), the output module (8) connected to an electrical load (10),
   at least two power paths (18*a-c*) connected in parallel between input (14) and output (16), wherein each of the power paths (18*a-c*) are configured to be switched between an active state (A) and an inactive state (I),
   a control unit (20) configured to switch at least one of the power paths (18*a-c*) to the inactive state (I) in a saving mode (S),
   wherein the control unit (20) switches different power paths (18*a-c*) alternately in time to inactive (I) in saving mode (S),
   wherein the saving mode (S) is activated when the electrical current (E) flowing through the interference suppression stage (12) is below a limit current (G).

2. The interference suppression stage (12) according to claim 1, the control unit (20) activates the saving mode (S) only after a waiting time (tw) after undercutting of the limit current (G).

3. The interference suppression stage (12) according to claim 1, wherein the control unit (20) switches an increasing number of power paths (18*a-c*) to the inactive state (I) in the saving mode (S) for a decreasing current (E).

4. The interference suppression stage (12) according to claim 1, wherein the control unit (20) switches all power paths (18*a-c*) to the inactive state (I) to the same extent in the temporal mean in the saving mode (S).

5. The interference suppression stage (12) according to claim 4, wherein the control unit (20) switches over the power paths (18*a-c*) such that a loading of respective identical components (24, 26, 32) contained in the power paths (18*a-c*) is equal in the temporal mean.

6. The interference suppression stage (12) according to claim 1, wherein the control unit (20) performs the switch-over of the power paths (18*a-c*) periodically in saving mode (S).

7. The interference suppression stage (12) according to claim 1, wherein the control unit (20) performs the switch-over of the power paths (18*a-c*) in the saving mode (S) in each case after an equal period of time (tu).

8. The interference suppression stage (12) according to claim 1, wherein the power path (18*a-c*) as longitudinal branch (22), contains a series circuit of a choke (24) and a diode (26), wherein between the choke (24) and the diode (26), a ground branch (28) having an electrical switching element (32) is connected.

9. A power supply (2), the power supply (2) comprising:
   an input module (4) for connecting to an electrical supply system (6),
   an output module (8) for connecting to an electrical load (10),
   wherein the power supply (2) contains an interference suppression stage (12) according to claim 1, which is connected with its input (14) to the input module (4) and connected with its output (16) to the output module (8).

10. An interference suppression stage (12) of a power supply (2), the interference suppression stage (12) comprising:
    an input (14) connected to an input module (4) of the power supply (2), the input module (4) connected to an electrical supply system (6),
    an output (16) connected to an output module (8) of the power supply (2), the output module (8) connected to an electrical load (10),
    at least two power paths (18*a-c*) connected in parallel between input (14) and output (16), wherein each of the power paths (18*a-c*) are configured to be switched between an active state (A) and an inactive state (I), a control unit (20) configured to switch at least one of the power paths (18a-c) to the inactive state (I) in a saving mode (S), wherein the control unit (20) switches different power paths (18a-c) alternately in time to inactive (I) in saving mode (S), wherein the control unit (20) switches an increasing number of power paths (18a-c) to the inactive state (I) in the saving mode (S) for a decreasing current (E).

11. A power supply (2), the power supply (2) comprising:

an input module (4) for connecting to an electrical supply system (6), an output module (8) for connecting to an electrical load (10), wherein the power supply (2) contains an interference suppression stage (12) according to claim 10, which is connected with its input (14) to the input module (4) and connected with its output (16) to the output module (8).

12. An interference suppression stage (12) of a power supply (2), the interference suppression stage (12) comprising:

an input (14) connected to an input module (4) of the power supply (2), the input module (4) connected to an electrical supply system (6), an output (16) connected to an output module (8) of the power supply (2), the output module (8) connected to an electrical load (10), at least two power paths (18a-c) connected in parallel between input (14) and output (16), wherein each of the power paths (18a-c) are configured to be switched between an active state (A) and an inactive state (I), a control unit (20) configured to switch at least one of the power paths (18a-c) to the inactive state (I) in a saving mode (S), wherein the control unit (20) switches different power paths (18a-c) alternately in time to inactive (I) in saving mode (S);

wherein the control unit (20) switches all power paths (18a-c) to the inactive state (I) to the same extent in the temporal mean in the saving mode (S), wherein the control unit (20) switches over the power paths (18a-c) such that a loading of respective identical components (24, 26, 32) contained in the power paths (18a-c) is equal in the temporal mean.

13. A power supply (2), the power supply (2) comprising:

an input module (4) for connecting to an electrical supply system (6), an output module (8) for connecting to an electrical load (10), wherein the power supply (2) contains an interference suppression stage (12) according to claim 12, which is connected with its input (14) to the input module (4) and connected with its output (16) to the output module (8).

14. An interference suppression stage (12) of a power supply (2), the interference suppression stage (12) comprising:

an input (14) connected to an input module (4) of the power supply (2), the input module (4) connected to an electrical supply system (6), an output (16) connected to an output module (8) of the power supply (2), the output module (8) connected to an electrical load (10), at least two power paths (18a-c) connected in parallel between input (14) and output (16), wherein each of the power paths (18a-c) are configured to be switched between an active state (A) and an inactive state (I), a control unit (20) configured to switch at least one of the power paths (18a-c) to the inactive state (I) in a saving mode (S), wherein the control unit (20) switches different power paths (18a-c) alternately in time to inactive (I) in saving mode (S), wherein the control unit (20) performs the switch-over of the power paths (18a-c) periodically in saving mode (S).

15. A power supply (2), the power supply (2) comprising:

an input module (4) for connecting to an electrical supply system (6), an output module (8) for connecting to an electrical load (10), wherein the power supply (2) contains an interference suppression stage (12) according to claim 14, which is connected with its input (14) to the input module (4) and connected with its output (16) to the output module (8).

* * * * *